(12) United States Patent
Jang et al.

(10) Patent No.: US 8,036,705 B2
(45) Date of Patent: Oct. 11, 2011

(54) APPARATUS AND METHOD OF A MOBILE COMMUNICATION TERMINAL FOR ACCESSING A PORTAL SITE

(75) Inventors: Ki-Tae Jang, Seongnam-si (KR); Seung-Ho Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1232 days.

(21) Appl. No.: 11/728,920

(22) Filed: Mar. 27, 2007

(65) Prior Publication Data
US 2008/0020798 A1    Jan. 24, 2008

(30) Foreign Application Priority Data
May 18, 2006    (KR) .................. 10-2006-0044484

(51) Int. Cl.
*H04B 1/38* (2006.01)
(52) U.S. Cl. ...................... 455/558; 713/168
(58) Field of Classification Search .................. 455/558; 713/160–168
See application file for complete search history.

(56) References Cited

U.S. PATENT DOCUMENTS

| | | | |
|---|---|---|---|
| 2002/0012433 A1* | 1/2002 | Haverinen et al. | 380/247 |
| 2004/0019891 A1 | 1/2004 | Koenen | |
| 2004/0193891 A1 | 9/2004 | Ollila | |
| 2006/0168658 A1* | 7/2006 | Kallio | 726/21 |
| 2006/0282880 A1* | 12/2006 | Haverinen et al. | 726/3 |

FOREIGN PATENT DOCUMENTS

| | | |
|---|---|---|
| EP | 1 631 000 | 3/2006 |
| KR | 1020030001579 | 2/2003 |
| KR | 1020030041942 | 5/2003 |
| KR | 102005003395 | 4/2005 |
| KR | 102006001714 | 2/2006 |

* cited by examiner

*Primary Examiner* — Rafael Pérez-Gutiérrez
*Assistant Examiner* — Marcos Batista
(74) *Attorney, Agent, or Firm* — The Farrell Law Firm, P.C.

(57) ABSTRACT

An apparatus and a method of a mobile communication terminal for accessing a portal site are provided, which include reading out an International Mobile Subscriber Identity (IMSI) from a Subscriber Identity Module (SIM) card, coding the read IMSI, and generating an ID using the coded IMSI, and provide easy, fast and safe access to the portal site and extended range of Wireless Application Protocol (WAP) portal marketing.

16 Claims, 4 Drawing Sheets

APPARATUS AND METHOD OF A MOBILE COMMUNICATION TERMINAL FOR ACCESSING A PORTAL SITE

PRIORITY

This application claims priority under 35 U.S.C. §119 to an application filed in the Korean Intellectual Property Office on May 18, 2006 and assigned Serial No. 2006-44484, the contents of which are incorporated herein by reference.

BACKGROUND OF THE INVENTION

1. Field of the Invention

The present invention relates generally to a mobile communication, and in particular, to an apparatus and method of a mobile communication terminal for accessing a portal site using International Mobile Station Identifier Numbers (IM-SIN).

2. Description of the Related Art

The communication schemes for mobile communication terminals generally include the Global System for Mobile Communication (GSM) using Europe-oriented Time Division Multiple Access (TDMA), and the North America-oriented Time Division Multiple Access (TDMA), and Code Division Multiple Access (CDMA).

In particular, the GSM is the standard that ensures high inter-operability between network users, and it is used universally around the world, including European and many other countries. A Subscriber Identity Module (SIM) card is mounted in a GSM mobile communication terminal. The SIM card is a detachable smart card and includes a microprocessor and a memory chip. The microprocessor and the memory chip are implanted in the SIM card such that the SIM card can store almost all necessary information to operate the mobile communication terminal, and in particular, store coded data including not only user's personal information, but also other related information such as telephone numbers or network numbers. A GSM terminal may communicate only after carrying out subscriber authentication of the SIM card. Therefore, the GSM terminal cannot communicate, with the exception of during an emergency, if there is no SIM card.

The SIM card also checks if a user is registered in the network, and stores Personal Identification Number (PIN) and Personal Unblocking Key (PUK) to prevent the use by unregistered users. Accordingly, users are requested to input a four-digit password in order to use a mobile communication terminal. If an incorrect PIN is input more than three times, the SIM card is locked and users have to input an eight-digit PUK to unlock the SIM card. Given the security that the SIM card can provide, users can conveniently carry only the SIM card and use their own or another's mobile communication terminals by mounting the SIM card to the mobile communication terminal. For example, a user who travels from Korea to a foreign country such as the United States may carry his SIM card and then attach the SIM card to a mobile communication terminal to use the terminal.

Meanwhile, a user of a mobile communication terminal may access and log onto a desired website via a browser by inputting user's Identification (ID) and password. However, when the user logs on, the user's information such as user name is provided to a Wireless Application Protocol (WAP) portal site. In order to maintain the privacy and avoid the inconveniences of having to input information for logon, many users simply visit the websites without going through the logon processes. As a result, operators have difficulty in managing history of the visitors, and cannot efficiently implement the target marketing focused on the site visitors. A good B2C (business to Consumer) business model can be provided, if a terminal subscriber can have both the anonymity and mileage, and the provider of the website can utilize the anonymous user's mileage and history of visits in his marketing. However, it is difficult to provide the simple logon process and user anonymity to the mobile communication terminal which visits the website.

SUMMARY OF THE INVENTION

An aspect of the present invention is to substantially solve at least the above problems and/or disadvantages and to provide at least the described advantages set forth below. Accordingly, an aspect of the present invention is to provide an apparatus and method of a mobile communication terminal for accessing a portal website.

Another aspect of the present invention is to provide an apparatus and method for enabling a mobile communication terminal to automatically access a portal site by transmitting a site address and unique ID.

A further aspect of the present invention is to provide an apparatus and method for enabling a mobile communication terminal to generate a unique ID using coded International Mobile Subscriber Identity (IMSI) and subscriber information.

In order to achieve the above aspects and/or other features of the present invention, there is provided a method of a mobile communication terminal for accessing a portal site, including reading out an International Mobile Subscriber Identity (IMSI) from a Subscriber Identity Module (SIM) card, and coding the read IMSI; and generating an ID using the coded IMSI.

In order to achieve another aspect of the present invention, there is provided a method of a server of a site for authenticating an access of a terminal, including detecting subscriber information of the terminal from an ID when the ID of the terminal is transmitted along with an address of the site; and authenticating an access of the terminal when the detected subscriber information of the terminal exists in the database.

In order to achieve yet another aspect of the present invention, there is provided an apparatus of a mobile communication terminal for accessing a portal site, including a Subscriber Identity Module (SIM) card for storing an International Mobile Subscriber Identity (IMSI) and secondly coding the first coded IMSI using a user authentication algorithm provided inside the SIM card when first coded IMSI is input; and a controller for reading out the IMSI from the SIM card, first coding the read IMSI using a cipher algorithm provided inside the terminal, reading out a secondly coded IMSI from the SIM card when detecting an event for an access to the portal site, and generating an ID using the read IMSI and a variety of subscriber information.

In order to achieve, still yet another aspect of the present invention, there is provided an apparatus of a mobile communication system for accessing a portal site, including a terminal for reading out an International Mobile Subscriber Identity (IMSI) from a Subscriber Identity Module (SIM) card, coding the read IMSI, generating an ID using the coded IMSI and subscriber information, and transmitting the generated ID to a server of the portal site, along with an address of the portal site; and a server for detecting information of the terminal based on the ID when the ID of the terminal is transmitted along with the address of the portal site, and authenticating the access of the terminal when the detected information of the terminal exists in the database.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

An apparatus and method of a mobile communication terminal for accessing a portal site according to the present invention will be explained herein below.

Figure 1:
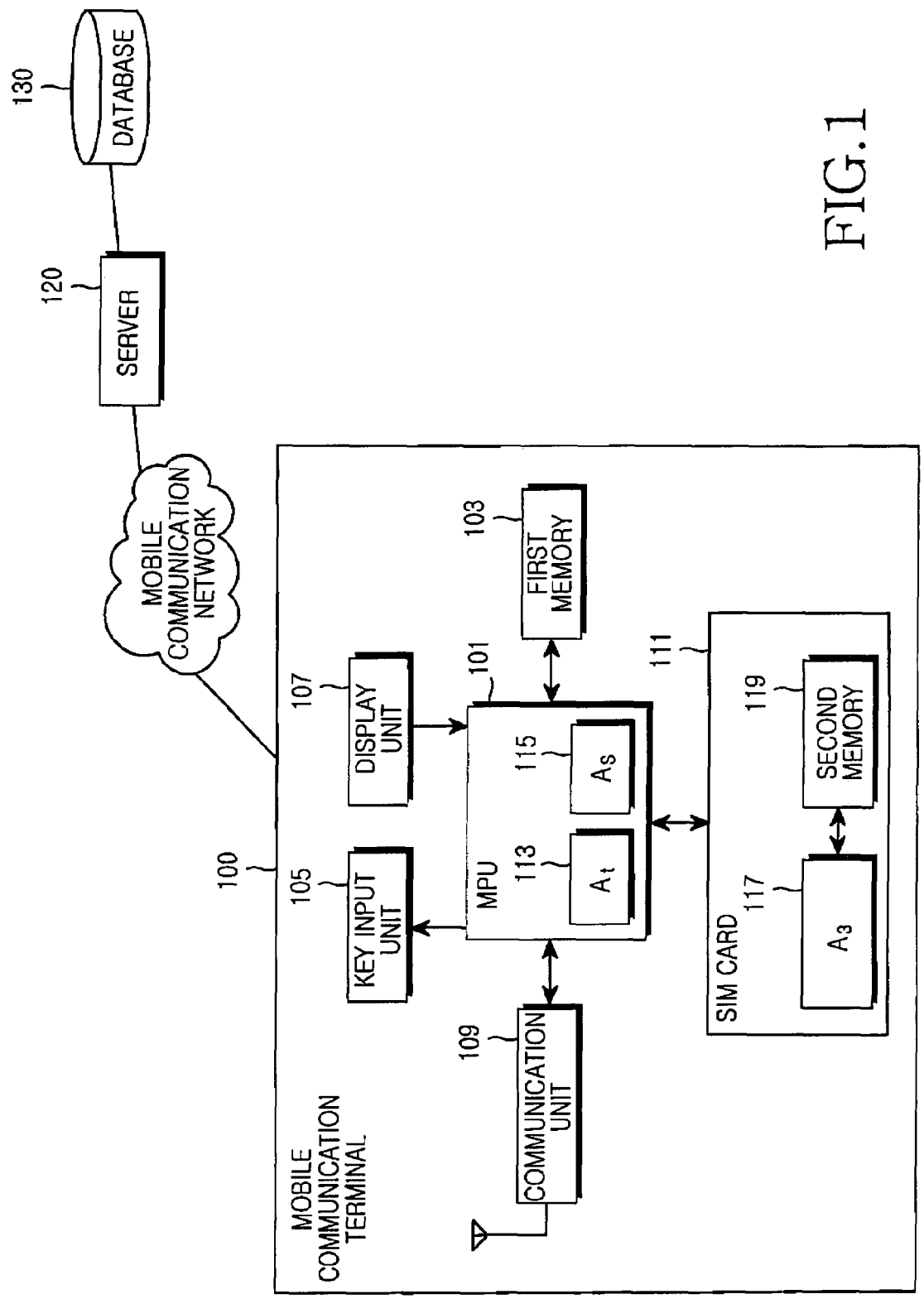
FIG. 1 illustrates the structure of a mobile communication system and a mobile communication terminal according to the present invention.

FIG. 1 illustrates the structure of a mobile communication system and a mobile communication terminal according to the present invention. The mobile communication system includes a mobile communication terminal 100, a server 120 and a database 130. The mobile communication terminal 100 includes a Micro-Processor Unit (MPU) 101, a first memory 103, a key input unit 105, a display unit 107, a communication unit 109 and a Subscriber Identity Module (SIM) card 111.

With reference to FIG. 1, the MPU 101 is for controlling the overall operation of the mobile communication terminal. For example, the MPU 101 performs usual processing and controlling of audio and data communication, as well as processes, according to an aspect of the present invention, generation of an ID using the International Mobile Subscriber Identity (IMSI) stored in the SIM card 111, transmitting the generated ID to the server of a site along with the site's URL for automatic access and logon. The MPU 101 can include a cipher algorithm (At) 113 such that the MPU 101 first ciphers the IMSI input from a second memory 19 of the SIM card 111 and outputs the coded IMSI to the SIM card 111. Additionally, the MPU 101 may include a generating algorithm (As) 115 such that the MPU 101 generates a unique ID using the secondly coded IMSI input from the SIM card 111 and various subscriber information read out from the first memory 103. The explanation about the known processing and controlling of the MPU 101 will be omitted for the sake of brevity.

The first memory 103 can include a Read Only Memory (ROM), a Random Access Memory (RAM) and a Flash ROM. The ROM stores micro-codes and other reference data for the processing and controlling of the MPU 101. According to an aspect of the present invention, the ROM particularly stores a program, which generates an ID using the IMSI stored in the SIM card 111, and transmits the generated ID along with the site URL to the site server for automatic access and logon. The RAM operates as a working memory of the MPU 101, and stores temporary data, which is generated during the execution of various programs. The flash ROM stores updatable data. According to an aspect of the present invention, the first memory 103 can store a variety of subscriber information. For example, the subscriber information can include information such as model name of the terminal, version of the algorithm, size of screen, remaining memory, the number of calls, the most frequent use time, the number of Short Message Service (SMS) uses, categories of music selections, and artist information of downloaded music. The information is read out and input to the generating algorithm (As) 115 under the control of the MPU 101.

The key input unit 105 can include numeric buttons 0 to 9, a menu button (MENU), a cancel button (DELETE), a confirm button, a call button (TALK), an Internet access button, a navigation key (or direction key), and other necessary buttons such as ▲ ▼ ◄►, and provides the MPU 101 with the key input data which corresponds to a key input by the user. The display unit 107 can display status information, which is generated during the operation of the mobile communication terminal 100, a limited number of characters, and a large amount of moving and still images. The display 107 may use a liquid crystal display (LCD).

The communication unit 109 carries out transmission and reception of a wireless signal, which is input and output over the antenna. For example, for data transmission, the communication unit 109 performs operations such as channel coding, spreading and radio frequency processing of data for transmission, and transmits the data. For data reception, the communication unit 109 performs operations such as baseband dispreading, and channel decoding to recover the incoming Radio Frequency (RF) signal to an original form.

The SIM card 111 is a smart card, which is removably mounted to a mobile communication terminal implementing Global System for Mobile Communication (GSM) communication. A UMTS Subscriber Identity Module (USIM) can be used as the SIM card 111, and the SIM card 111 stores subscriber information such as password, and data for operating mobile communication terminal, and data for network registration. The SIM card 111 stores the IMSI, which is the unique serial number. The IMSI is a fifteen digit long identity number, which is allocated to the mobile terminal upon subscription to the GSM. The IMSI includes the Mobile Country Code (MCC), the Mobile Network Code (MNC), the mobile subscriber identity number and the country mobile subscriber identity number, and is used for authentication during system access. According to an aspect of the present invention, the SIM card 111 additionally includes an internal user authentication cipher algorithm (A3) 117, and a second memory 119 such that the IMSI stored in the second memory 119 is output to the At 113 under the control of the MPU 101, and when the first coded IMSI is input from the At 113, the first coded IMSI is secondly coded and stored in the second memory 119 and output to the As 115 according to the control of the MPU 101.

Figure 2:
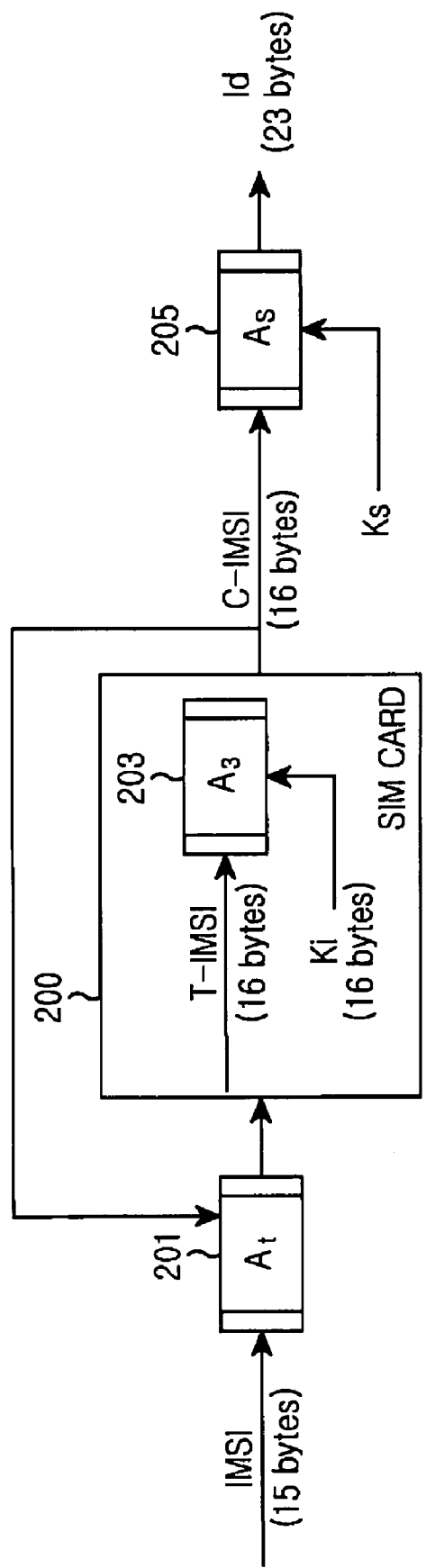
FIG. 2 illustrates the process of a mobile communication terminal to generate an Identification (ID) using International Mobile Subscriber Identity (IMSI) according to the present invention.

Referring now to FIG. 2, the process of generating an ID using the IMSI will be described herein below.

The At 201 of the MPU 101 carries out the first cipher by computing the 15-byte IMSI, which is input from the second memory 119 of the SIM card 200, with a given value, and outputs a 16-byte Temporary IMSI (T-IMSI). Next, the A3 203 of the SIM card 200 secondly ciphers the first coded 16-byte T-IMSI input from the At 201, using a 16-byte shared security key Ki, and generates a Coded IMSI (C-IMSI) of certain bytes such as 4 bytes. The A3 203 can directly output to the As 205 the 4-byte C-IMSI according to the control of the MPU 101, but alternatively, the C-IMSI can be output to the At 201 for additional cipher for increasing the security of the C-IMSI output to the As 205. For example, the above-described process can twice repeat such that an 8-byte C-IMSI is output to the As 205 according to the control of the MPU 101. Alternatively, the above process can repeat four times, in which a 16-byte C-IMSI is output to the As 205 of the MPU 101. Accordingly, the A3 203 outputs a coded IMSI of certain bytes, such as 16 bytes, that is, the A3 203 outputs the unique C-IMSI used in the GSM to the As 205 of the MPU 101. The C-IMSI can be stored in the second memory 119. The Ki may have varied length up to a maximum of 16 bytes, depending on the operator, and it has a unique value assigned to each SIM card. The As 205 of the MPU 101 then reads out the C-IMSI from the second memory 119, and generates an ID for accessing a desired site, using the key Ks, which includes the variety of subscriber information stored in the first memory 103, and the read C-IMSI. The ID, when generated, is transmitted to a server 120 of the site via a mobile communication network, along with the URL of the site.

The mobile communication network operates to transmit URLs of sites received from a plurality of terminals 100 and IDs of the terminals 100 to the corresponding server 120. The mobile communication network can include a base transceiver station, a base station controller, and a mobile switching center. The base station controller forms a wireless link with the mobile communication terminal 100. Additionally, the base station controller controls a plurality of base transceiver stations, and carries out operations such as wireless channel setting, frequency hopping and handover processing, and the mobile switching center operates to set routes for a requested call.

The server 120 includes a database 130 and it analyzes the ID of the terminal 100, which is transmitted along with the URL, to thus detect the C-IMSI and subscriber information of the terminal 100. Accordingly, the server 120 authenticates the request of the terminal 100 for an access and login, by searching the detected information in the database 130 and investigating whether the terminal 100 is registered. The database 130 manages the C-IMSI and subscriber information of the terminal 100, and may additionally manage the history of the terminal 100. Additionally, the server 120 may occasionally check the connection status of the SIM card 111 of the terminal 100.

Figure 3:
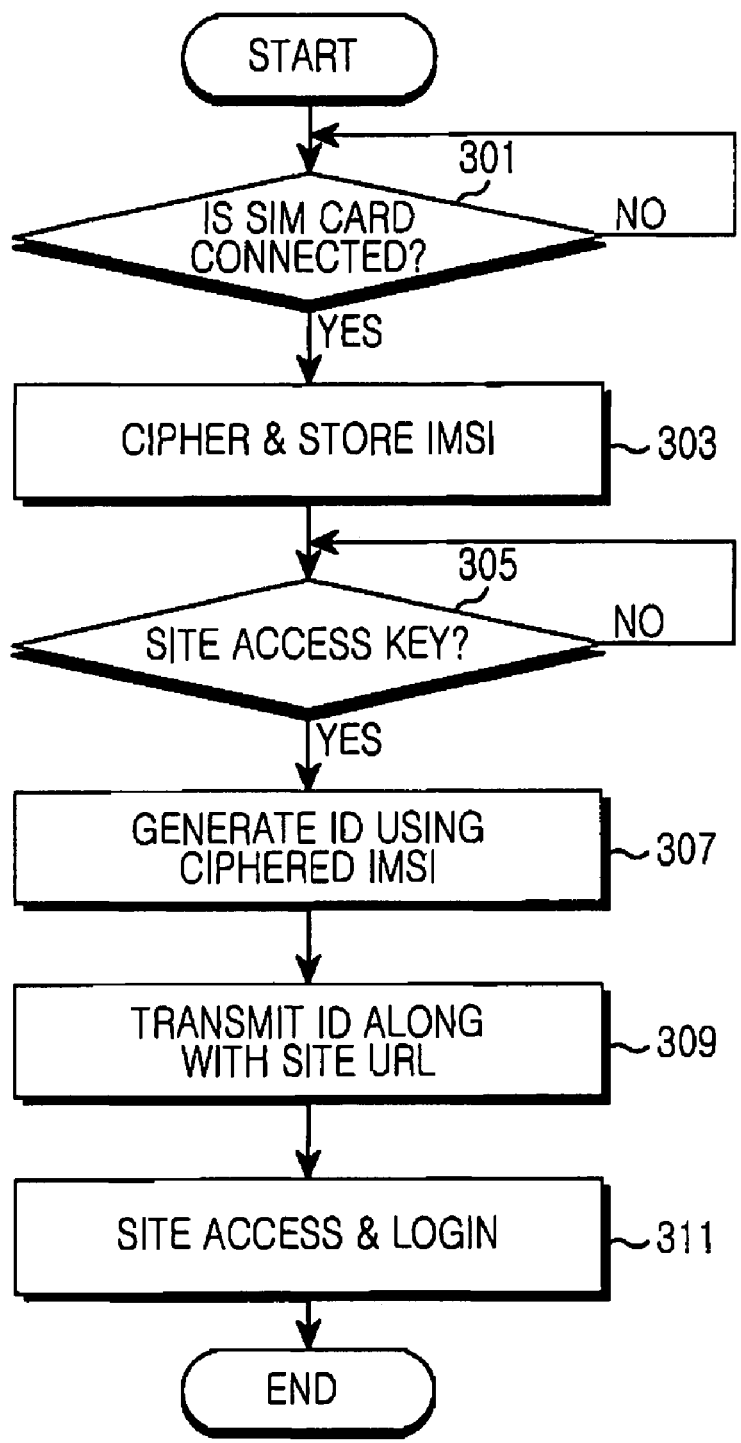
FIG. 3 is a flowchart illustrating the process of a mobile communication terminal to generate an ID using IMSI and access a portal site according to the present invention.

FIG. 3 is a flowchart illustrating the process of a mobile communication terminal 100 for generating an ID using IMSI and accessing a portal site according to the present invention. Referring to FIG. 3, in step 301a terminal 100 determines whether the SIM card 111 is connected. When detecting that the SIM card 111 is connected, the terminal 100 reads out IMSI from the second memory 119 of the SIM card 111, ciphers the read IMSI using the unique cipher algorithm At 113 provided within the terminal 100 and the user authentication algorithm A3 117 provided within the SIM card 111, and stores the coded IMSI in the second memory 119, in step 303. Simply, the terminal 100 first ciphers the IMSI stored in the second memory 119 of the SIM card 111 using the At 113, and secondly ciphers the first coded IMSI using the A3 117 such that the C-IMSI, which is coded two times, is stored in the second memory 119.

Thereafter, the terminal 100 investigates as to whether there is any key input for an access to a site via the browser in step 305. When detecting a key input for an access to the site, the terminal 100 moves to step 307 in which the terminal 100 reads out the C-IMSI from the second memory 119 of the SIM card 111, reads out a variety of subscriber information from the first memory 103 of the terminal 100, and generates a unique ID using the read C-IMSI and the subscriber information according to the ID generating algorithm As 115. The subscriber information may include information such as, inter alias, model name of the terminal 100, version of the algorithm, size of screen, remaining memory, the number of calls, the most frequent use time, the number of Short Message Service (SMS) uses, titles of selected music, and artist information of downloaded music, and the server 120 can provide services that suit the taste of the subscriber using the subscriber information.

In step 309, the terminal 100 then transmits to the site the generated ID along with the URL of the site. The server 120 of the site authenticates access and login if the ID corresponds to the subscriber ID previously registered in the database 130. The terminal 100 then completes access and login process in step 311, and thus finishes algorithm according to the present invention.

Figure 4:
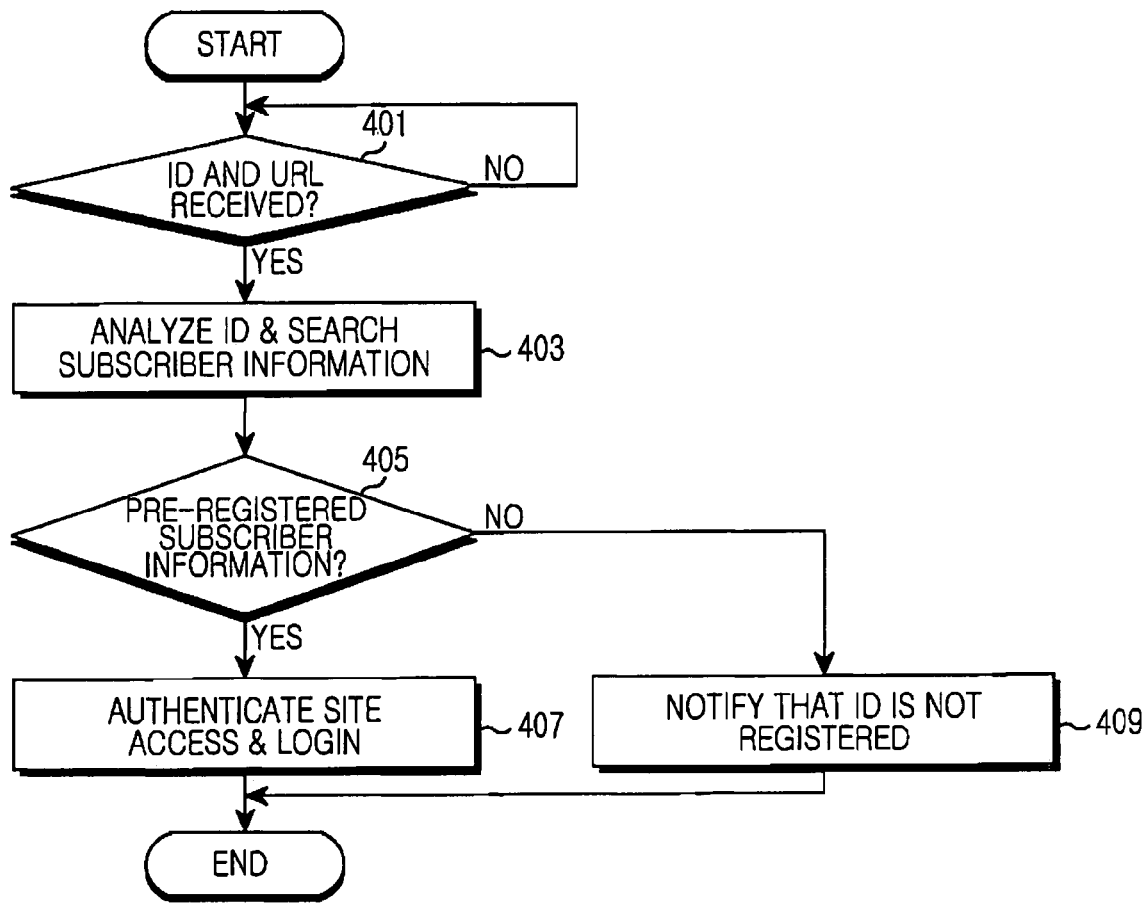
FIG. 4 is a flowchart illustrating the process of a portal site server for authenticating an access of a terminal according to the present invention.

FIG. 4 is a flowchart illustrating the process of a portal site server authenticating an access of a terminal according to the present invention. Referring to FIG. 4, in step 401 the server 120 determines whether its own URL is received along with an ID of a terminal 100. When determining whether its URL is received along with an ID of the terminal 100, the server 120 analyzes the ID received in step 403, reads out the C-IMSI and the subscriber information of the ID, and searches from the database 130 the C-IMSI and the subscriber information corresponding to the ID to determine whether the terminal 100 is previously registered, in step 403.

In step 405, the server 120 then determines whether the searched C-IMSI and the subscriber information correspond to the previously registered C-IMSI and the subscriber information of the terminal 100. Upon determining that the searched C-IMSI and the subscriber information do not correspond to the previously registered information, the server 120 moves on to step 409, in which the server 120 notifies that the ID is not previously registered. Upon determining that the searched C-IMSI and the subscriber information correspond to the previously registered information, the server 120 moves on to step 407, in which the server 120 authenticates the access and login to the site. At this time, the server 120 may update the subscriber information of the terminal 100 of the database 130. Accordingly, the server 120 may provide services that suit the preferences of a subscriber based on the subscriber information.

For example, when determining that screen of the terminal 100 has enlarged from the subscriber information, the server 120 may provide the terminal 100 with a media file corresponding to the increased screen size of the terminal 100. Additionally, when the terminal 100 requests downloading of a media file, the server 120 may check the remaining memory of the terminal 100 and provide the terminal 100 with the contents in the amount that is appropriate for the remaining memory of the terminal 100. In other words, if a subscriber desires to download high-resolution contents and there is a shortage of memory capacity to do so, the server 120 may notify the situation to the subscriber and thereby allow the user to select whether to continue downloading or change to down-converted contents. The server 120 then completes the algorithm according to the present invention.

Although the exemplary the present invention, as described above, coded the IMSI using the At 113 and secondly coded the IMSI using the A3 117 for more security of the ID, the algorithms 113 and 117 may be used in reverse order, or one algorithm may be used repeatedly to cipher the IMSI. Alternatively, one algorithm may be included in the other algorithm to increase the security of the ID.

Additionally, although it is described herein that the C-IMSI is generated in response to the connection of the SIM card 111, the C-IMSI may also be generated periodically in an idle state in the present invention. Alternatively, the C-IMSI may be generated when a key for accessing a site is detected.

Additionally, although it is described herein that the ID is transmitted to the server 120 of site when detecting an access key to the site, the ID may also be transmitted upon request of the server 120 in the present invention.

As explained above, with the apparatus and method for automatically accessing a portal site according to the present invention, a unique ID is generated using C-IMSI, which is coded in the mobile communication terminal 100, and the subscriber information, and the unique ID is transmitted along with an address of a site. Because subscriber authentication is carried out automatically, without requiring a subscriber to input ID and password, a simple and fast login can be provided. Additionally, because the ID is generated using the internal cipher algorithms of the SIM card 111, security is ensured, and because the subscriber's name or information is not transmitted to the site when accessing the site, the subscriber can remain anonymous and subscriber's privacy can be protected. Furthermore, because IMSI is used as the login information and the cipher algorithms may be additionally used, the status of the terminal 100 can be immediately transmitted to the portal site upon login such that a variety of Wireless Application Protocol (WAP) portal marketing is possible such as providing the terminal 100 with the contents in accordance with the remaining memory size.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for accessing a portal site by a mobile communication terminal, comprising:
   reading an International Mobile Subscriber Identity (IMSI) from a Subscriber Identity Module (SIM) card;
   first coding the read IMSI using a cipher algorithm provided within the terminal;
   secondly coding the first coded IMSI using a user authentication algorithm provided within the SIM card;
   generating an Identification (ID) using the coded IMSI; and
   transmitting the generated ID to a server of the portal site.

2. The method of claim 1, wherein the IMSI is read out from the SIM card when it is detected that the SIM card is connected.

3. The method of claim 1, wherein generating an ID comprises generating the ID using the coded IMSI and subscriber information, when a key input for an access to the portal site is detected.

4. The method of claim 1, further comprising transmitting the generated ID to a server of the portal site along with an address of the portal site.

5. The method of claim 3, wherein the subscriber information comprises at least one of a terminal model name, and algorithm version information.

6. The method of claim 1, further comprising repeating the first and the second coding with respect to the secondly coded IMSI.

7. The method of claim 6, wherein the secondly coded IMSI is variable through the repeating of the first and the second coding.

8. The method of claim 1, wherein the generating step generates the ID using the coded IMSI and the subscriber information, when a request for transmitting the ID is received from the server.

9. The method of claim 1, further comprising reading out the IMSI from the SIM card, when a key input for an access to the portal site is detected.

10. A method for authenticating an access of a terminal by a server of a site, comprising:
    detecting subscriber information of the terminal from an Identification (ID) when the ID of the terminal is transmitted along with an address of the site; and
    authenticating an access of the terminal when the detected subscriber information of the terminal exists in the database, wherein the subscriber information includes an International Mobile Subscriber Identity (IMSI), first coded using a cipher algorithm provided within the terminal and secondly coded using the first coded IMSI using a user authentication algorithm provided within the SIM card.

11. An apparatus of a mobile communication terminal for accessing a portal site, comprising:
    a Subscriber Identity Module (SIM) card for storing an International Mobile Subscriber Identity (IMSI), and secondly coding a first coded IMSI using a user authentication algorithm provided within the SIM card when the first coded IMSI is input; and
    a controller for reading out the IMSI from the SIM card, first coding the read IMSI using a cipher algorithm provided within the terminal, inputting the first coded IMSI to the SIM card, reading out a secondly coded IMSI from the SIM card when detecting an event for an access to the portal site, generating an Identification (ID) using the read IMSI and a variety of subscriber information and transmitting the generated ID to a server of the portal site.

12. The apparatus of claim 11, wherein the SIM card stores the coded IMSI.

13. The apparatus of claim 11, wherein when a request for transmitting an ID is received from the server, the controller reads out the secondly coded IMSI from the SIM card and generating an ID using the read IMSI and the subscriber information.

14. The apparatus of claim 11, wherein the controller transmits the generated ID to a server of the portal site, along with an address of the portal site.

15. An apparatus of a mobile communication system for accessing a portal site, comprising:
    a terminal for reading out an International Mobile Subscriber Identity (IMSI) from a Subscriber Identity Module (SIM) card, first coding the read IMSI using a cipher algorithm provided within the terminal, secondly coding the first coded IMSI using a user authentication algorithm provided within the SIM card, generating an Identification (ID) using the coded IMSI and subscriber information, and transmitting the generated ID to a server of the portal site, along with an address of the portal site; and
    a server for detecting information of the terminal based on the ID when the ID of the terminal is transmitted along with the address of the portal site, and authenticating the access of the terminal when the detected information of the terminal exists in the database.

16. The apparatus of claim 15, wherein the subscriber information comprises at least one of a terminal model name and algorithm version information.

* * * * *